(12) United States Patent
Minagawa et al.

(10) Patent No.: US 7,569,632 B2
(45) Date of Patent: *Aug. 4, 2009

(54) RUBBER COMPOSITION AND PROCESS FOR PREPARING THE SAME

(75) Inventors: Yasuhisa Minagawa, Kobe (JP); Noriko Yagi, Kobe (JP); Noboru Wakabayashi, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/471,531

(22) Filed: Jun. 21, 2006

(65) Prior Publication Data

US 2007/0015861 A1    Jan. 18, 2007

(30) Foreign Application Priority Data

Jul. 15, 2005  (JP) ............................. 2005-207087
Dec. 6, 2005   (JP) ............................. 2005-351853

(51) Int. Cl.
*B60C 1/00*      (2006.01)
*C08K 3/38*      (2006.01)

(52) U.S. Cl. ..................... 524/405; 524/404; 524/492; 524/571

(58) Field of Classification Search ................. 524/405, 524/424

See application file for complete search history.

(56) References Cited

U.S. PATENT DOCUMENTS

| | | |
|---|---|---|
| 5,652,310 A | 7/1997 | Hsu et al. |
| 5,872,176 A * | 2/1999 | Hergenrother et al. ...... 524/494 |
| 6,005,027 A | 12/1999 | Guillet et al. |
| 6,107,384 A * | 8/2000 | Hatakeyama et al. ....... 524/405 |
| 6,855,427 B2 | 2/2005 | Kunkeler et al. |
| 2005/0187332 A1 * | 8/2005 | Minagawa et al. .......... 524/492 |

FOREIGN PATENT DOCUMENTS

| | | |
|---|---|---|
| EP | 0 794 188 A | 9/1997 |
| EP | 0 890 602 A | 1/1999 |
| EP | 0 890 602 B1 | 2/2003 |
| EP | 1 566 404 A | 8/2005 |
| GB | 2284214 A | 5/1995 |
| JP | 5-51484 A | 3/1993 |
| JP | 07-216234 A | 8/1995 |
| JP | 9-3206 A | 1/1997 |
| JP | 11-255964 A | 9/1999 |
| JP | 11-269313 A | 10/1999 |
| JP | 2001-233997 A | 8/2001 |
| JP | 2001-247718 A | 9/2001 |
| JP | 2002-13084 A | 1/2002 |
| KR | 20020032846 A | 5/2002 |

OTHER PUBLICATIONS

Aldrich: Handbook of Fine Chemicals and Laboratory Equipment, 2003-2004, p. 1579.*

* cited by examiner

*Primary Examiner*—Vickey Nerangis
(74) *Attorney, Agent, or Firm*—Birch, Stewart, Kolasch & Birch LLP

(57) ABSTRACT

A rubber composition which is effective in improving the reaction efficiency of a silane coupling agent in kneading, suppressing generation of air bubbles, improving processability and abrasion resistance and lowering rolling resistance, and a process for preparing the same, wherein the rubber composition includes silica, 3 to 15 parts by weight of a silane coupling agent based on 100 parts by weight of the silica and 0.3 to 1.45 parts by weight of a potassium salt based on 100 parts by weight of silica.

7 Claims, No Drawings

RUBBER COMPOSITION AND PROCESS FOR PREPARING THE SAME

BACKGROUND OF THE INVENTION

The present invention relates to a rubber composition improving the reaction coefficient of a silane coupling agent and various physical properties.

Recently, compatibility between lowering the fuel cost of a tire (reduction in rolling resistance) and improving wet grip performance (brake performance) has been intensely required and silica is compounded in a tread in order to satisfy the requirement. However, in general, silica is hardly dispersed in a rubber composition and sufficient reinforcing property for the rubber composition can not be obtained only by silica; therefore, a silane coupling agent is used at the same time in combination with silica. Further, a silane coupling agent containing an alkoxyl group is generally used for tire use. However, the reaction of the silane coupling agent cannot be sufficiently completed in the step of kneading a rubber and the silane coupling agent cannot but be compounded beyond necessity in order to obtain sufficient reinforcing property. Further, there has been a problem that a silane coupling agent (hereinafter, referred to as an unreacted silane coupling agent) which cannot be reacted during kneading causes a reaction in an extrusion step to generate alcohol (such as ethanol) and air bubbles are generated in an unvulcanized tread.

As a method of solving the problem, JP-A-2001-247718 discloses that various sodium salts are compounded with a rubber composition. Although the reaction efficiency of a silane coupling agent can be improved by the method, effect of suppressing generation of air bubbles in an extruded tread is not sufficiently obtained by sodium salts and the generation of air bubbles in the extruded tread could not be perfectly suppressed. Further, there has been a problem that a sodium salt is not sufficiently dispersed in a rubber composition.

SUMMARY OF THE INVENTION

An object of the present invention is to provide a rubber composition improving the reaction efficiency of a silane coupling agent in kneading, suppressing the generation of air bubbles, improving processability and abrasion resistance and lowering rolling resistance (improving rolling resistance performance) and a process for preparing the same.

The present invention relates to a rubber composition comprising silica, wherein 3 to 15 parts by weight of a silane coupling agent based on 100 parts by weight of silica and 0.3 to 1.45 parts by weight of a potassium salt based on 100 parts by weight of silica are contained.

The potassium salt is preferably an inorganic potassium salt, and more preferably potassium tetraborate.

The rubber composition further contains water, and a process for preparing the rubber composition preferably comprises a step of preparing a masterbatch by previously mixing the potassium salt, a part of the silica and the water and a step of kneading the masterbatch together with a rubber component.

The potassium salt is at least one selected from the group consisting of potassium carbonate, potassium hydrogencarbonate and potassium borate.

DETAILED DESCRIPTION

The rubber composition of the present invention comprises a rubber component, silica, a silane coupling agent and a potassium salt.

Examples of the rubber component are, specifically, a natural rubber (NR), a styrene-butadiene rubber (SBR), a butadiene rubber (BR), an isoprene rubber (IR), an ethylene-propylene-diene rubber (EPDM), a chloroprene rubber (CR), an acrylonitrile-butadiene rubber (NBR), and a butyl rubber (IIR), which are generally used in the rubber industry.

These rubbers may be used alone and at least 2 kinds may be used in combination. Among these, diene base rubbers are preferably used as the rubber component because wet grip performance and further abrasion resistance are improved, at least one selected from the group consisting of NR, BR and SBR are preferable and one comprising NR, BR and SBR or SBR is more preferable.

An example of silica is silica prepared by a wet process or a dry process but is not particularly limited.

An amount of silica in the rubber composition is at least 10 parts by weight based on 100 parts by weight of the rubber component, more preferably at least 20 parts by weight, further preferably at least 30 parts by weight, and particularly preferably at least 40 parts by weight. When the amount of silica is less than 10 parts by weight, improvement effects of wet grip performance and low fuel cost property, which are the merits of adding silica, tends to be hardly obtained. Further, the amount of silica in the rubber composition is at most 150 parts by weight based on 100 parts by weight of the rubber component, more preferably at most 130 parts by weight, and further preferably at most 120 parts by weight. When the amount of silica exceeds 150 parts by weight, the obtained rubber composition is too hard, sufficient wet grip performance can not be obtained, adhesion on a roll in steps is deteriorated and silica tends to cause defect in dispersion in the rubber. Further, the amount of silica includes an amount of silica in a masterbatch.

The silane coupling agent is a silane coupling agent which is conventionally used in combination with silica. Specific examples are sulfides such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropyl methacrylate monosulfide and 3-trimethoxysilylpropyl methacrylate monosulfide; mercaptos such as 3-mercaptopropyltrimethoxysilane, 3-mercaptopropyltriethoxysilane, 2-mercaptoethyltrimethoxysilane and 2-mercaptoethyltriethoxysilane; vinyls such as vinyl triethoxysilane and vinyl trimethoxysilane; aminos such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxys such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitros such as 3-nitropropyltrimethoxysilane and 3-nitropropyltriethoxysilane; and chloros such as 3-chloropropyltrimethoxysilane, 3-chloropropyltriethoxysilane, 2-chloroethyltrimethoxysilane and 2-chloroethyltriethoxysilane. Bis(3-triethoxysilylpropyl)tetrasulfide, bis(3-triethoxysilylpropyl)disulfide, 3-mercaptopropyltrimethoxysilane and the like are preferably used from the viewpoint of the compatibility between the effect of adding a coupling agent and cost thereof. These silane coupling agents may be used alone or at least 2 kinds may be used in combination.

An amount of the silane coupling agent is at least 3 parts by weight based on 100 parts by weight of silica and preferably at least 5 parts by weight. When the amount is less than 3 parts by weight, not only that coupling effect is insufficient, thus, wet grip performance is not sufficiently obtained, but also abrasion resistance is lowered. Further, the amount of the silane coupling agent is at most 15 parts by weight based on 100 parts by weight of silica and preferably at most 13 parts by weight. When the amount exceeds 15 parts by weight, the obtained rubber composition becomes hard and the wet grip performance is lowered. Further, the amount of silica being the basis of the amount of a silane coupling agent is an amount of the whole silica in the rubber composition.

The potassium salt used in the present invention includes an inorganic potassium salt and an organic potassium salt. Examples of the inorganic potassium salt are potassium tetraborate, potassium carbonate, potassium hydrogencarbonate, potassium sulfate, potassium hydrogen phosphate, potassium dihydrogen phosphate, and potassium oxalate. Examples of the organic potassium salt are potassium acetate, potassium gluconate, potassium citrate, potassium fumarate, potassium laurate, potassium palmitate, potassium stearate, potassium oleate, and potassium linolate.

The potassium salt used in the present invention is preferably an inorganic potassium salt for the reason that the reaction efficiency of the silane coupling agent is further improved, among these, at least one of the potassium salts selected from the group consisting of potassium carbonate, potassium hydrogencarbonate, potassium borate and potassium tetraborate is more preferable, and potassium tetraborate is particularly preferable. Further, the inorganic potassium salt and the organic potassium salt may be also an anhydrate of a potassium salt or a hydrate of a potassium salt.

A potassium salt generally has particles with a particle diameter of at least 500 μm and, since the melting point of the potassium salt is high which is at least 800° C., it remains easily as large particles in the rubber composition after vulcanization. Then, there may be a case that a tire prepared by using the rubber composition can not sufficiently obtain abrasion resistance by changing a kind of vehicle loading the tire and its size.

The rubber composition exhibiting excellent abrasion resistance regardless of a tire size and a kind of vehicle can be obtained in the present invention by lessening the particle diameter of the potassium salt and reducing its compounding amount as little as possible.

The average particle diameter of the potassium salt is preferably at least 0.5 μm and more preferably at least 1 μm. When the average particle diameter is less than 0.5 μm, the potassium salt is easily agglomerated and tends to form large agglomerates in the rubber composition. Further, the average particle diameter of the potassium salt is preferably at most 350 μm and more preferably at most 300 μm. When the average particle diameter exceeds 350 μm, the potassium salt remains as large particles also after vulcanization and tends to have an adverse effect on abrasion resistance.

An amount of the potassium salt is at least 0.3 part by weight based on 100 parts by weight of silica and preferably at least 0.4 part by weight. When the amount is less than 0.3 part by weight, the improving effect of reaction efficiency of the silane coupling agent tends to be very small. Further, the amount of the potassium salt is at most 1.45 parts by weight based on 100 parts by weight of silica, and preferably at most 1 part by weight. When the amount of the potassium salt exceeds 1.45 parts by weight, a lot of large particles remain in the rubber composition after vulcanization, abrasion resistance tends to be lowered, which has an adverse effect on a vehicle.

In the rubber composition of the present invention, compounding agents such as reinforcing agents such as carbon black, a softening agent such as an aroma oil, zinc oxide, stearic acid, an antioxidant, a vulcanizing agent and a vulcanization accelerator, which are generally used in the rubber industry, can be compounded if necessary, in addition to the rubber components, silica, silane coupling agent and potassium salt.

The process for preparing the rubber composition of the present invention in the first mode preferably comprises (1) a kneading step by an enclosed kneader such as a Banbury mixer (kneading step (1)) and (2) a roll kneading step by an open roll and the like (kneading step (2)). Further, since the kneading step (1) uses an enclosed kneader, the kneading temperature is raised in proportion to the kneading time.

In the kneading step (1), after the kneading temperature reaches at 140° C. by rise in temperature by kneading, kneading is preferably carried out for further at least 10 seconds and kneading is more preferably carried out for at least 15 seconds. When the kneading time after reaching at 140° C. is less than 10 seconds, an unreacted silane coupling agent remains in the rubber composition and it causes a reaction to generate air bubbles; thus, the rolling resistance performance tends to be lowered.

Further, in the kneading step (1), after the kneading temperature reaches at 150° C. by rise in temperature by kneading, kneading is preferably carried out for further at least 5 seconds and kneading is more preferably carried out for at least 10 seconds. When the kneading time after reaching at 150° C. is less than 5 seconds, an unreacted silane coupling agent remains in the rubber composition and it causes a reaction to generate air bubbles; thus, the rolling resistance performance tends to be lowered.

The rubber composition of the present invention can enhance the reaction rate of the silane coupling agent and improve the physical properties of the obtained rubber composition, by lessening the amount of the potassium salt to be 0.3 to 1.45 part by weight based on 100 parts by weight of silica and further setting the kneading temperature and the kneading time at least a fixed value.

Further, the process for preparing the rubber composition of the present invention in the second mode comprises (3) a step of preparing a masterbatch by previously mixing a potassium salt, a part of silica and water (step (3)) and (4) a step of kneading the masterbatch together with the rubber component (step (4)).

The amount ratio of the potassium salt in the masterbatch is preferably at least 1% by weight, and more preferably at least 5% by weight. When the amount ratio of the potassium salt in the masterbatch is less than 1% by weight, it is not preferable since the effect of suppressing generation of air bubbles is small at forming a rubber compound and a degree of adhesion to a roll is large. Further, the amount ratio of the potassium salt in the masterbatch is preferably at most 50% by weight and more preferably at most 40% by weight. When the amount ratio of the potassium salt in the masterbatch exceeds 50% by weight, defect in dispersion of potassium borate is easily caused and performance such as abrasion does not tend to be sufficiently obtained.

The amount ratio of silica in the masterbatch is preferably at least 10% by weight, and more preferably at least 20% by weight. When the amount ratio of silica in the masterbatch is less than 10% by weight, the cohesiveness of the masterbatch becomes poor and does not tend to be sufficiently dispersed at mixing in a rubber.

An amount ratio of water in the masterbatch is preferably at least 5% by weight and more preferably at least 10% by weight. When the amount ratio of water in the masterbatch is less than 5% by weight, the potassium salt does not tend to be sufficiently dispersed. Further, the amount ratio of water in the masterbatch is preferably at most 90% by weight and more preferably at most 80% by weight. When the amount ratio of water in the masterbatch exceeds 90% by weight, cohesiveness of the masterbatch becomes poor and handing thereof tends to be difficult.

The masterbatch is kneaded with the rubber component in the step (4).

The compounding amount of the masterbatch in the step (4) is preferably at least 2 parts by weight based on 100 parts by weight of the rubber component, more preferably at least 10 parts by weight, and further preferably at least 20 parts by weight. When the amount of the masterbatch is less than 2 parts by weight, the effect of the potassium salt tends to be hardly obtained. Further, the compounding amount of the masterbatch in the step (4) is preferably at most 150 parts by weight based on 100 parts by weight of the rubber component, and at most 120 parts by weight. When the amount of the masterbatch exceeds 150 parts by weight, moisture in the masterbatch is not sufficiently evaporated during kneading and, as a result, the effect of suppressing the generation of air bubbles tends to be small.

In the step (4), further, reinforcing fillers for such as silica and carbon black and additives such as a silane coupling agent, zinc oxide, stearic acid, a softening agent, an antioxidant, a wax, a vulcanizing agent and a vulcanization accelerator are preferably kneaded.

The rubber composition obtained by the preparation process of the present invention can be used for tires and can be used preferably for particularly a tire tread among tire parts.

When a tire is prepared from the rubber composition of the present invention, the rubber composition is processed by extrusion in the shape of components of a tire (such as a tire tread) and pasted on a tire molding machine by a usual method to mold an unvulcanized tire, and further the unvulcanized tire is heated and pressurized in a vulcanizer to prepare a tire.

The rubber composition of the present invention is used as a rubber composition for a tire and it is preferably used for a rubber composition for a tire tread, in particular.

EXAMPLES

The present invention is explained in detail based on Examples but is not limited to thereto.

Various chemicals used in Examples and Comparative Examples are described.

SBR (1): SBR NS210 available from ZEON Corporation.

SBR (2): Nipol 9520 (emulsion SBR, containing 37.5 parts by weight based on 100 parts by weight of rubber solid) available from ZEON Corporation.

BR: BR150 B available from Ube Industries Ltd.

NR: RSS#3.

Carbon black: DIABLACK I (N220) available from Mitsubishi Chemical Corporation.

Silica: Ultrasil VN3 available from Degussa Japan Corporation

Silane coupling agent (1): Si266 (bis(3-triethoxysilylpropyl) disulfide) available from Degussa Japan Corporation.

Silane coupling agent (2): Si266 (bis(3-triethoxysilylpropyl) disulfide) available from Degussa Corporation.

Aroma oil (1): X140 available from JOMO Co., Ltd.

Aroma oil (2): DIANA PROCESS AH24 available from Idemitsu Kosan Co., Ltd.

Wax: OZOACE 0355 available from NIPPON SEIRO CO., LTD.

Antioxidant (1): NOCRAC 6C available from OUCHI SHINKO CHEMICAL INDUSTRIAL CO., LTD.

Antioxidant (2): SANTOFLEX 6C available from Flexsys K. K.

Vulcanizing accelerator TBBS: NOCCELER NS available from OUCHI SHINKO CHEMICAL INDUSTRIAL CO., LTD.

Vulcanizing accelerator DPG: NOCCELER D available from OUCHI SHINKO CHEMICAL INDUSTRIAL CO., LTD.

Stearic acid (1): TUBAKI available from NOF Corporation.

Stearic acid (2): KIRI available from NOF Corporation.

Zinc oxide (1): ZINC OXIDE available from Mitsui Mining & Smelting Co., Ltd.

Zinc oxide (2): GINREI R available from Toho Zinc Co., Ltd.

Potassium tetraborate tetrahydrate ($K_2B_4O_7 \cdot 4H_2O$): 48 Mesh Under product (product passing through a 48 mesh sieve) (average particle diameter of 170 μm, melting point of 815° C. (anhydrate)) available from YONEYAMA YAKUHIN KOGYO CO., LTD.

Potassium tetraborate: available from Yoneyama Chemical Co. Ltd.

Masterbatch of potassium borate (potassium borate MB):

Examples 1 to 7 and Comparative Examples 1 to 10

The preparation of the rubber compositions of Examples 1 to 7 and Comparative Examples 1 to 10 are explained in the following.

First, 100 parts by weight of SBR (1), 55 parts by weight of silica, 20 parts by weight of carbon black, 10 parts by weight of aroma oil (1), 4.4 parts by weight of a silane coupling agent (1) and potassium tetraborate tetrahydrate in amounts shown in Tables 1 and 2 were kneaded using a 1.7 L Banbury mixer, and after the kneaded articles reached respectively at the kneading temperatures shown in Tables 1 and 2, they were kneaded for the kneading times from reaching the kneading temperature shown in Tables 1 and 2 to obtain the first kneaded articles (hereinafter, referred to as the first kneaded articles).

Then, further, 2 parts by weight of stearic acid (1), 3 parts by weight of zinc oxide (1) and 1 part by weight of an antioxidant (1) were added to the first kneaded articles, kneaded using the 1.7 L Banbury mixer and after they respectively reached the kneading temperatures shown in Table 1 and 2, the second kneaded articles were immediately discharged (hereinafter, referred to as the second kneaded articles).

Further, 1.5 parts by weight of sulfur, 1 part by weight of a vulcanization accelerator TBBS and 0.5 parts by weight of a vulcanization accelerator DPG were added to the second kneaded articles and kneaded at 60° C. for 5 minutes using a roll to obtain respective unvulcanized rubber sheets.

The obtained rubber compositions were vulcanized by a press at 170° C. for 20 minutes to obtain vulcanized articles. Tests for respective properties shown below were carried out on the obtained respective vulcanized articles.

Description of the Test Methods (Abrasion Index)

The volume loss amount of each vulcanized articles was measured for a test time of 3 minutes under the respective conditions of (i) a load of 2.5 kgf and a slip ratio of 40%, (ii) a load of 1.5 kgf and a slip ratio of 60%, and (iii) a load of 3.5 kgf and a slip ratio of 20%, using a Lambourn abrasion tester. Further, each volume loss amount was shown by an index (abrasion index). The larger the index is, the more excellent the abrasion resistance is.

The abrasion indices of Examples 1 to 7 and Comparative Examples 1 to 10=(Volume loss amount of Comparative Example 1/each volume loss amount)×100

(Rolling Resistance Index)

The tan δ of each vulcanized article was measured under the conditions of an initial strain of 10% and a dynamic strain of 2% at a temperature of 70° C. using a viscoelastic spectrometer VES (manufactured by Iwamoto Seisakusyo K.K.) and each was shown by an index (rolling resistance index) by the following equation. The larger the index is, the more excellent the rolling resistance performance is.

Rolling resistance indices of Examples 1 to 7 and Comparative Examples 1 to 10=(tan δ of Comparative Example 1/each tan δ)×100

(Amount of Unreacted Silane Coupling Agent)

Each unvulcanized rubber sheet in the preparation step of the vulcanized articles was finely cut and an extraction test was carried out for 24 hours using ethanol. Further, an amount of the unreacted silane coupling agent extracted in an extraction solution was measured with gas chromatography and the weight ratio (% by weight) of the amount of the unreacted silane coupling agent based on the whole compounding amount of the silane coupling agent was calculated. It is indicated that the smaller the weight ratio is, the smaller the amount of the unreacted silane coupling agent is, which is favorable.

Test results are shown in Tables 1 and 2.

TABLE 1

|  | Examples ||| Comparative Examples ||||||
|---|---|---|---|---|---|---|---|---|---|
|  | 1 | 2 | 3 | 1 | 2 | 3 | 4 | 5 | 6 |
| Compositions (part by weight) ||||||||||
| Silica | 55 | 55 | 55 | 55 | 55 | 55 | 55 | 55 | 55 |
| Silane coupling agent (1) | 4.4 | 4.4 | 4.4 | 4.4 | 4.4 | 4.4 | 4.4 | 4.4 | 4.4 |
| Potassium tetraborate tetrahydrate | 0.55 | 0.28 | 0.55 | 0 | 2.2 | 1.1 | 0.14 | 0 | 0 |
| (Amount of potassium tetraborate Tetrahydrate)/(amount of silica) | 1.00 | 0.51 | 1.00 | 0 | 4.00 | 2.00 | 0.25 | 0 | 0 |
| Temperature to reach kneading (° C.) | 150 | 150 | 140 | 150 | 150 | 150 | 150 | 150 | 140 |
| Kneading time from reaching temperature to reach kneading (sec.) | 0 | 0 | 0 | 0 | 0 | 0 | 0 | 10 | 15 |
| Evaluation results ||||||||||
| Abrasion index ||||||||||
| (load 2.5 kgf, slip ratio 40%) | 106 | 103 | 106 | 100 | 106 | 108 | 101 | 101 | 100 |
| (load 1.5 kgf, slip ratio 60%) | 95 | 99 | 90 | 100 | 85 | 89 | 100 | 100 | 99 |
| (load 3.5 kgf, slip ratio 20%) | 106 | 101 | 105 | 100 | 110 | 113 | 100 | 98 | 95 |
| Rolling resistance index | 103 | 101 | 101 | 100 | 108 | 107 | 100 | 100 | 100 |
| Amount of unreacted silane coupling agent (%) | 3.8 | 10.8 | 5.6 | 21.3 | 0 | 0 | 19.8 | 18.9 | 20.5 |

TABLE 2

|  | Examples |||| Comparative Examples ||||
|---|---|---|---|---|---|---|---|---|
|  | 4 | 5 | 6 | 7 | 7 | 8 | 9 | 10 |
| Compositions (part by weight) |||||||||
| Silica | 55 | 55 | 55 | 55 | 55 | 55 | 55 | 55 |
| Silane coupling agent (1) | 4.4 | 4.4 | 4.4 | 4.4 | 4.4 | 4.4 | 4.4 | 4.4 |
| Potassium tetraborate tetrahydrate | 0.55 | 0.28 | 0.55 | 0.28 | 2.2 | 1.1 | 0.14 | 0.14 |
| (Amount of potassium tetraborate tetrahydrate)/(amount of silica) | 1.00 | 0.51 | 1.00 | 0.51 | 4.00 | 2.00 | 0.25 | 0.25 |
| Temperature to reach kneading (° C.) | 150 | 150 | 140 | 140 | 150 | 150 | 150 | 140 |
| Kneading time from reaching temperature to reach kneading (sec.) | 10 | 10 | 15 | 15 | 10 | 10 | 10 | 15 |

TABLE 2-continued

|  | Examples | | | | Comparative Examples | | | |
| --- | --- | --- | --- | --- | --- | --- | --- | --- |
|  | 4 | 5 | 6 | 7 | 7 | 8 | 9 | 10 |
| Evaluation results | | | | | | | | |
| Abrasion index | | | | | | | | |
| (load 2.5 kgf, slip ratio 40%) | 107 | 103 | 106 | 106 | 108 | 109 | 101 | 100 |
| (load 1.5 kgf, slip ratio 60%) | 97 | 101 | 96 | 100 | 86 | 91 | 100 | 99 |
| (load 3.5 kgf, slip ratio 20%) | 106 | 102 | 106 | 106 | 110 | 113 | 99 | 99 |
| Rolling resistance index | 106 | 103 | 101 | 101 | 110 | 109 | 100 | 100 |
| Amount of unreacted silane coupling agent (%) | 0 | 5.9 | 1.2 | 7.2 | 0 | 0 | 17.4 | 18.6 |

Among Examples, particularly in Examples 4 to 7, an amount of potassium tetraborate based on silica was set as at most 1.45 parts by weight and further, a kneading time and a kneading temperature were set as being constant. Thereby, it could be attained that the abrasion index was at least 95 and further, the amount of the unreacted silane coupling agent was at most 10%.

On the other hand, in Comparative Examples 2, 3, 7 and 8, when an amount of potassium tetraborate was made large, the abrasion index at a load of 1.5 kgf and a slip ratio of 60% was decreased while the amount of the unreacted silane coupling agent was zero and the rolling resistance index was improved. Accordingly, when tires obtained from the rubber compositions of Comparative Examples 2, 3, 7 and 8 were used as the idler wheels of a light vehicle, it is considered that the abrasion resistance is lowered.

Examples 8 to 9 and Comparative Examples 11 to 13

Preparation Process of Potassium Borate Masterbatch (Potassium Borate MB)

Potassium borate MB was prepared by mixing potassium tetraborate, pure water and silica by a stirrer at 40° C. for 30 minutes (20% by weight of potassium tetraborate, 50% by weight of pure water and 30% by weight of silica).

(Preparation Process of Rubber Sheets of Examples 8 to 9 and Comparative Examples 11 to 13)

First, various chemicals described in Table 3 other than sulfur and a vulcanizing agent were kneaded using a 1.7 L Banbury mixer at about 150° C. for 5 minutes according to the compounding amounts in Table 3.

Sulfur and the vulcanizing agent in the compounding amounts described in Table 3 were added to the obtained kneaded articles using a biaxial open roll, and they were kneaded at about 80° C. for 5 minutes and vulcanized by press at 170° C. for 12 minutes to obtain rubber sheets (thickness of a sheet: 2 mm). The following tests were carried out using the respective rubber sheets.

(Air-in Test)

Rubber test pieces (5 cm square and a thickness of 16 mm) cut out from the rubber sheets were left alone in an oven at 130° C. for an hour. Then, the rubber test pieces were taken out from the oven, the inner state of the rubber test pieces was observed and evaluation was carried out with point rating as follows.

5 points: no foam is confirmed at all.

4 points: fine air with a size of at most 1 mm can be confirmed.

3 points: fine air with a size of at least 1 mm can be confirmed.

2 points: a large number of fine air with a size of at least 1 mm are generated (swelling is externally apparent).

1 point: air is linked to form a cavity (which is also externally apparent).

(Adhesion Test)

One of the two open rolls is set at a temperature of 70±3° C. (No. 1 roll) and another roll is set at a temperature of 25±3° C. (No. 2 roll). The rubber sheets are heated in the No. 1 roll and after confirming that a temperature of the rubbers is raised to at least 70° C., they are placed into the No. 2 roll and the degree of adhesion is observed and evaluation was carried out with point rating as follows.

3 points: the sheet can be easily peeled off from the roll.

2 points: the sheet seems to adhere on the roll but can be peeled off from the roll.

1 point: since continuous working cannot be carried out due to adhesion, the rubber must be peeled off by stopping the roll.

(Visual Confirmation of Dispersion)

The rubber sheets were cut with a cutter knife and their sections were observed and evaluation was carried out with point rating as follows.

3 points: white particles are not found.

2 points: white particles can be slightly confirmed.

1 point: a large number of white particles can be confirmed.

(Lambourn Abrasion Test)

The volume loss amount of each rubber sheet was measured under the conditions of a slip ratio of 60% and a test time of 2 minutes using a Lambourn abrasion tester. Each volume loss amount was shown by an index by the following equation. The larger the index is, the more excellent the abrasion resistance is.

(Abrasion index)=(Volume loss amount of Comparative Example 11)/(Volume loss amount of each composition)×100

Respective test results are shown in Table 3.

TABLE 3

|  | Example | | Comparative Example | | |
| --- | --- | --- | --- | --- | --- |
|  | 8 | 9 | 11 | 12 | 13 |
| Compositions (part by weight) | | | | | |
| SBR (2) | 68.75 | 68.75 | 68.75 | 68.75 | 68.75 |
| (Solid content in SBR) | (50) | (50) | (50) | (50) | (50) |

TABLE 3-continued

|  | Example | | Comparative Example | | |
|---|---|---|---|---|---|
|  | 8 | 9 | 11 | 12 | 13 |
| (Oil content in SBR) | (18.75) | (18.75) | (18.75) | (18.75) | (18.75) |
| BR | 30 | 30 | 30 | 30 | 30 |
| NR | 20 | 20 | 20 | 20 | 20 |
| Silica | 80 | 80 | 80 | 80 | 80 |
| Carbon black | 20 | 20 | 20 | 20 | 20 |
| Silane coupling agent (2) | 6.4 | 6.4 | 6.4 | 6.4 | 6.4 |
| Zinc oxide (2) | 20 | 20 | 20 | 20 | 20 |
| Stearic acid (2) | 1 | 1 | 1 | 1 | 1 |
| Aroma oil (2) | 30 | 30 | 30 | 30 | 30 |
| Antioxidant (2) | 3 | 3 | 3 | 3 | 3 |
| Wax | 2 | 2 | 2 | 2 | 2 |
| Potassium borate MB | 5 | 10 | — | — | — |
| (Potassium tetraborate in MB) | (1) | (2) | — | — | — |
| (Pure water in MB) | (2.5) | (5) | — | — | — |
| (Silica in MB) | (1.5) | (3) | — | — | — |
| Potassium tetraborate | — | — | — | 1 | 2 |
| Sulfur | 1.5 | 1.5 | 1.5 | 1.5 | 1.5 |
| Vulcanization accelerator | 1 | 1 | 1 | 1 | 1 |
| Test results | | | | | |
| Air-in test point rating | 4 | 5 | 2 | 4 | 4 |
| Adhesion test point rating | 2 | 3 | 1 | 2 | 3 |
| Dispersion point rating | 3 | 3 | — | 2 | 1 |
| Abrasion index | 105 | 104 | 100 | 92 | 86 |

According to the present invention, reaction efficiency of a silane coupling agent can be improved, generation of air bubbles can be suppressed and, simultaneously, improvement in abrasion resistance and lowering of rolling resistance are enabled by compounding silica, a specific amount of a silane coupling agent and a potassium salt having high ionization tendency for the rubber composition. Further, a rubber composition, in which a potassium salt is sufficiently dispersed and further processability and abrasion resistance are improved, can be produced by kneading the masterbatch prepared by preliminarily mixing the potassium salt, a part of silica and water together with a rubber component.

What is claimed is:

1. A rubber composition comprising
   a rubber component,
   silica,
   3 to 15 parts by weight of a silane coupling agent based on 100 parts by weight of silica and 0.3 to 1 parts by weight of potassium tetraborate tetrahydrate based on 100 parts by weight of silica, wherein the silane coupling agent is bis(3-triethyoxysilypropyl)disulfide.

2. The rubber composition of claim 1, wherein the silica is present in the rubber component in an amount of at least 10 parts by weight based on 100 parts by weight of the rubber component.

3. The rubber composition of claim 1, wherein the average particle diameter of the potassium tetraborate tetrahydrate is from 0.5 to 350 µm.

4. A process for preparing the rubber composition of claim 1 comprising a step of preparing a masterbatch by previously mixing the potassium tetraborate tetrahydrate, a part of the silica and water and a step of kneading the masterbatch together with the rubber component.

5. A vehicle tire comprising the rubber composition of claim 1.

6. A vehicle tire which exhibits an improvement in abrasion resistance, a lowering of rolling resistance and a reduced amount of unreacted silane coupling agent which comprises:
   a rubber component,
   at least 10 parts by weight of silica based on 100 parts by weight of the rubber component,
   3 to 15 parts by weight of bis(3-triethyoxysilypropyl) disulfide as a silane coupling agent based on 100 parts by weight of silica and
   0.3 to 1 parts by weight of potassium tetraborate tetrahydrate based on 100 parts by weight of silica.

7. The vehicle tire of claim 6, wherein silica is present in an amount of from 10 to 150 parts by weight.

* * * * *